June 7, 1949.  P. S. GREIDER  2,472,205
RHEOSTAT FOR WELDING
Filed Feb. 14, 1947
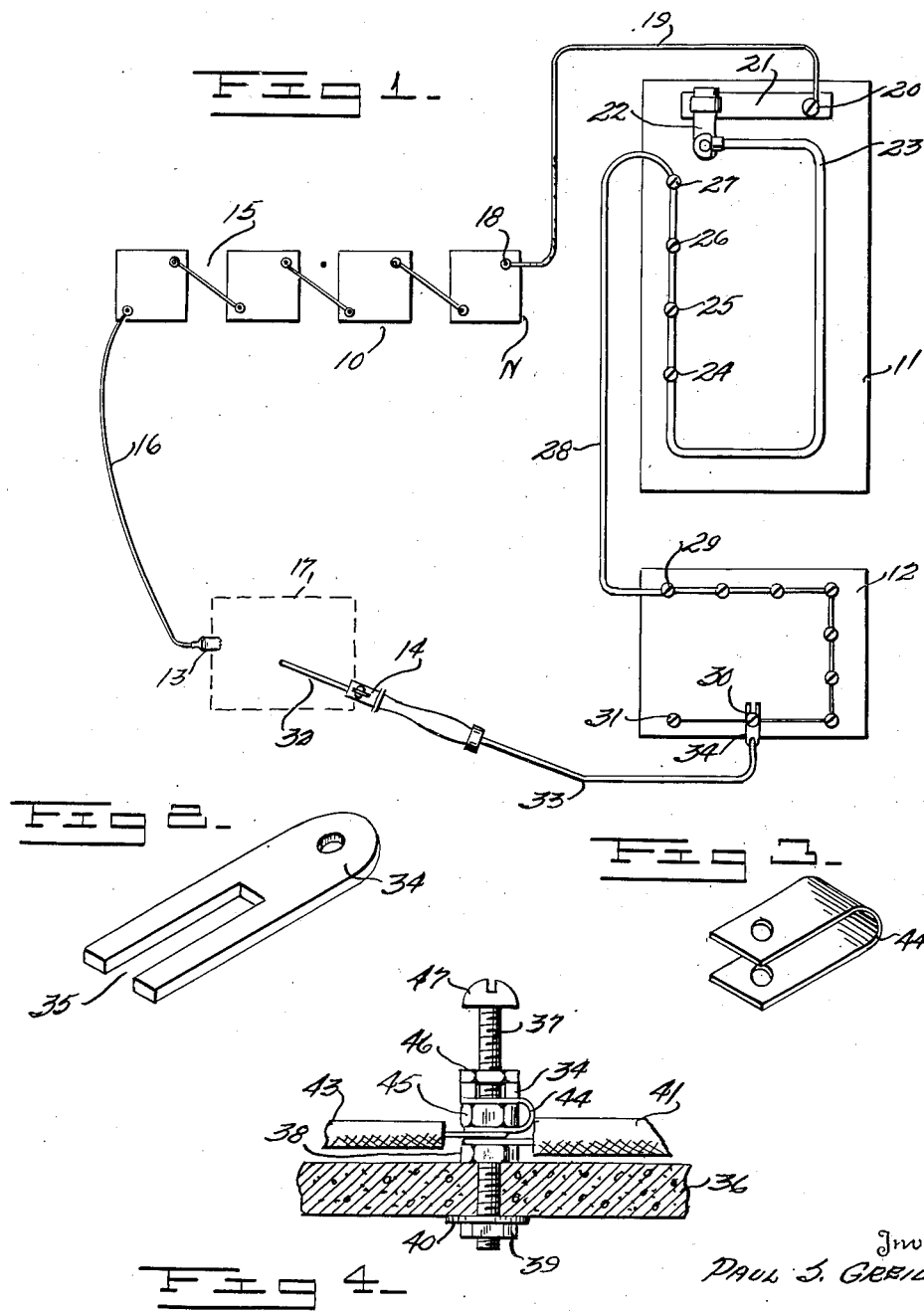
Inventor
PAUL S. GREIDER Patented June 7, 1949

2,472,205

UNITED STATES PATENT OFFICE 2,472,205

RHEOSTAT FOR WELDING

Paul S. Greider, Aberdeen, Md.

Application February 14, 1947, Serial No. 728,543

2 Claims. (Cl. 201—61)

This invention relates to comparatively small welding outfits of the portable type, and in particular, a welding outfit using as a source of current a plurality of storage batteries, such as batteries used in motor vehicles, with one welding electrode connected to a terminal of one of the batteries, and, with the batteries connected in series, the terminal at the opposite end is connected to the other welding electrode through regulators or current-reducing elements.

The purpose of this invention is to provide a comparatively small portable welding outfit using batteries as a source of current in which a plurality of connections are provided for one of the electrodes, wherein the amperes may be increased or reduced by attaching the electrode to the different terminals.

In combining a plurality of storage batteries in a portable welding outfit, the normal amperage is relatively high, and if it is not reduced, it will burn out wires and connections of the welder. With this thought in mind, this invention contemplates means for reducing the amperage in a portable welding outfit by connecting a plurality of terminals in series with the number of strands in the wires connecting the terminals reduced from one terminal to another.

The object of this invention is, therefore, to provide a plurality of current regulators or reducers that may be connected in a circuit to one of the electrodes of a portable welding outfit using a plurality of batteries as the source of current, wherein the amperes of the welding electrodes may be controlled.

Another object of the invention is to provide a current-reducing device for portable welding outfits, wherein the amperes are reduced without the use of coils or resistors.

Another object of the invention is to provide a connector for electrode cables on portable welding outfits that may readily be connected to or disconnected from terminals in which a positive contact is provided when the connector is attached to the terminal.

A further object of the invention is to provide a portable battery welding outfit with means for reducing and regulating the amperes of the current incorporated therein which is of a comparatively simple and economical construction.

With these and other objects in view, the invention embodies a plurality of storage batteries connected in series with a welding connector connected to a terminal at one end and with the other end connected through ampere-reducing and regulating devices to an electrode associated with the connector, wherein the ampere-reducing and regulating devices include a plurality of consecutive terminals with the capacity of the connections between the terminals reduced from one terminal to another.

Other features and advantages of the invention will appear from the following description taken in connection with the drawings, wherein:

Figure 1 is a diagrammatic view illustrating a typical portable welding outfit including storage battery-reducers and regulators and electrodes.

Figure 2 is a view showing a connector at the end of the electrode cable.

Figure 3 is a detail showing a U-shaped strip used on one of the terminals providing a positive contact around a lock nut thereon.

Figure 4 is a detail showing a terminal mounted in a concrete slab with the slab illustrated in section.

Referring now to the drawings, wherein like reference characters indicate corresponding parts, the welding outfit of this invention includes a plurality of storage batteries 10, an ampere reducer 11, a regulator 12, a connector 13, and an electrode holder 14.

The batteries 10 are connected in series by cables 15, and the terminal of a battery at one end is connected by a cable 16 to the connector 13 through which current may be supplied to a plate or other device, as indicated by the dash lines 17. The terminal 18 at the opposite end of the series of batteries is connected by a cable 19 to a terminal 20 on a copper strip 21, and the opposite end of the copper strip is connected by a fuse 22 to a cable 23. In the design shown, as an illustration, the cable 23 is a 200-ampere cable formed of about sixty strands of wire and insulated. This cable extends to a terminal 24 from which it is reduced to forty-five strands of wire providing a 150-ampere cable which extends to the terminal 25. From the terminal 25, the cable is reduced to thirty-one strands of wire providing a 75-ampere cable, and this extends to a terminal 26 where it is again reduced to fourteen strands of wire providing a 30-ampere cable. This cable extends to the terminal 27 where the strands are again reduced providing a cable of 7 strands capable of carrying 25 amperes. From the terminal 27 the cable 28 extends to a terminal 29 on the regulator 12 and on the regulator the cable extends through a series of terminals, being again reduced from one terminal to another with a comparatively small cable connecting the last two terminals 30 and 31. The holder 14 for an electrode 32 is provided with a cable 33 having a connector 34 with a slot 35 therein at the end, and this connector is adapted to be secured on one of the terminals of the regulator 12, as illustrated in Figure 4.

The terminals are mounted in a concrete or composition slab 36, as illustrated in Figure 4, with each terminal provided with a threaded post 37 having a nut 38 on one side of the slab and with the inner end held by a nut 39 with a washer 40 between the nut and slab. The cable is reduced at each terminal, and it will be noted in the drawings that the end of a comparatively large cable, as indicated by the numeral 41, is shown at one side with an end 43 of a comparatively smaller cable shown on the other side of the terminal. The wires of the cable extend around the post and are directly associated with a brass or copper clip 44, as illustrated in Figure 3, the clip straddling a lock nut 45. The connector 34 is positioned on the clip 44 and clamped thereto by a lock nut 46. The post may be provided with a screw head 47 with a slot therein for a screw driver, if desired.

The portable welding outfit of this invention, therefore, includes a plurality of storage batteries with reducing and regulating elements having stationary parts and connectors and electrodes, wherein the electrode may be connected to different terminals of the reducers or regulators, depending upon the amperage desired for welding.

The parts are illustrated in their preferred form, although it will be understood that modifications may be made in the design or arrangement of the parts without departing from the spirit of the invention.

What is claimed is:

1. In a welding outfit, an ampere regulator comprising an insulating plate, a plurality of spaced threaded posts mounted upon the plate and projecting above the plate, a pair of nuts arranged above the plate and carried by each threaded post, resistance devices arranged above the plate and having terminals at their opposite ends, the terminals being arranged in superposed contacting relation and arranged between the superposed nuts, a U-shaped copper clip for each threaded post and having openings near its ends to receive the threaded post, the U-shaped clip straddling the upper nut and having its lower side contacting with the terminal of one resistance device and its upper side contacting with the upper nut, a lock nut carried by each threaded post and disposed above the upper side of the clip, and a slotted connector for insertion between the lock nut and the upper side of the U-shaped clip, the connector being adapted for connection with a wire and one end threaded post being adapted for connection with a wire.

2. In a welding outfit, an ampere regulator comprising an insulating plate having a plurality of spaced vertical openings, a plurality of spaced vertical threaded posts mounted within the vertical openings and projecting above the plate, a nut carried by the lower end of each threaded post and arranged beneath the plate, a pair of nuts arranged above the plate and carried by each threaded post, the lower nut in each pair engaging the plate to clamp it against the nut beneath the plate, resistance devices arranged above the plate and having terminals at their opposite ends, the terminals being arranged in superposed contacting relation and arranged between the superposed nuts in the pairs, a U-shaped copper clip for each threaded post having upper and lower sides provided near their ends with openings to receive the post, the U-shaped clip straddling the upper nut in each pair and having its lower side contacting with the terminal of one resistance device and its upper side contacting with the upper surface of the upper nut in each pair, a lock nut carried by each threaded post and disposed above the upper side of the clip, and a removable slotted connector for insertion between the lock nut and the upper side of the U-shaped slip, the connector being adapted for connection with a wire and one threaded end post being adapted for connection with a wire.

PAUL S. GREIDER.

REFERENCES CITED

The following references are of record in the file of this patent:

UNITED STATES PATENTS

| Number | Name | Date |
|---|---|---|
| 462,207 | Coffin | Oct. 27, 1891 |
| 492,713 | Coffin | Feb. 28, 1893 |
| 1,183,264 | Woodrow | May 16, 1916 |